United States Patent [19]
Gilwee, Jr. et al.

[11] 4,061,812
[45] Dec. 6, 1977

[54] HONEYCOMB-LAMINATE COMPOSITE STRUCTURE

[75] Inventors: William J. Gilwee, Jr., Sunnyvale; John A. Parker, Los Altos, both of Calif.

[73] Assignee: The United States of America as represented by the Administrator of the National Aeronautics and Space Administration, Washington, D.C.

[21] Appl. No.: 698,646

[22] Filed: June 22, 1976

[51] Int. Cl.² ............................................. B32B 3/12
[52] U.S. Cl. ............................ 428/117; 106/15 FP; 260/2.5 N; 260/2.5 R; 428/290; 428/71; 428/920; 428/73
[58] Field of Search ............. 106/15 FP; 260/2.5 N, 260/2.5 R; 428/71, 73, 116, 117, 118, 920, 921, 310–313, 314–315, 290

[56] References Cited
U.S. PATENT DOCUMENTS

| | | |
|---|---|---|
| 2,744,042 | 5/1956 | Pace ................................. 428/117 X |
| 3,535,130 | 10/1970 | Webb ................................ 106/15 FP |
| 3,562,223 | 2/1971 | Bargain et al. ..................... 260/78 |
| 3,663,464 | 5/1972 | Sawko ............................... 106/15 FP |
| 3,673,058 | 6/1972 | Jackson et al. .................... 428/118 |
| 3,730,891 | 5/1973 | Riccitiello et al. ............... 106/15 FP |
| 3,811,997 | 5/1974 | Yuan ................................. 428/116 |
| 3,872,564 | 3/1975 | Myers et al. ...................... 418/116 X |

*Primary Examiner*—Geroge F. Lesmes
*Assistant Examiner*—Henry F. Epstein
*Attorney, Agent, or Firm*—Darrell G. Brekke; Armand McMillan; John R. Manning

[57] ABSTRACT

A honeycomb-laminate composite structure comprising
a. a cellular core of a polyquinoxaline foam in a honeycomb structure, and
b. a layer of a non-combustible fibrous material impregnated with a polyimide resin laminated on the cellular core, a process for producing the honeycomb-laminate composite structure and articles containing the honeycomb-laminate composite structure.

12 Claims, 3 Drawing Figures

FIG.1

FIG.2A — INVENTION

HONEYCOMB-LAMINATE COMPOSITE STRUCTURE

STATEMENT OF ORIGIN

The invention described herein was made by employees of the United States Government and may be manufactured and used by or for the Government for Governmental purposes without the payment of any royalties thereby or therefore.

BACKGROUND OF THE INVENTION

1. Field of the Invention

This invention relates to a honeycomb core-laminate composite structure useful, for example, as a light weight panel or structural member in aircraft, watercraft, and housing and commercial structural applications. More specifically, this invention relates to a composite structure comprising a honeycomb structure filled with a polyquinoxaline foam with a layer of a polyimide resin impregnated noncombustible fibrous material laminated on a surface of the core. This invention also relates to a process for producing the above-described composite structure and to articles employing therein the above-described composite structure.

2. Description of the Prior Art

Typical prior art composite structures, generally used as interior panels in aircraft, watercraft, etc., particularly where light-weight materials are desirable, comprise a decorative surface bonded to a laminate on a honeycomb core. Such a core material known in the prior art for a "sandwich" composite generally utilizes a honeycomb structure whose cells have hexagonal shape (hereinafter, for simplicity, "honeycomb" structure). The cells of the honeycomb structure can be unfilled or can be filled with materials such as a polurethane foam or a phenolic microballoon-filled epoxy potting compound. Layers of materials, for example, pre-imgregnated glass fibrous materials are then adhesively laminated to the core and a decorative surface, for example, produced by silk screening can then be placed thereon in order to produce, for example, a panel material which can be used in the interior of aircraft, watercraft, etc. In the prior art a transparent polyvinyl fluoride film has been bonded, using polymethylmethacrylate, to the decorative surface to provide protection. The material generally bonded to the honeycomb core structure employed in the prior art is a glass cloth material pre-impregnated with an epoxy resin and on bonding of this to the honeycomb core structre, the glass cloth pre-impregnated with the epoxy resin can be subjected to a texturizing operation to provide a surface texture thereto.

In the aircraft industry, in particular, fires constitute a series threat to life and result in considerable economic losses to airlines and the airline industry. In addition, in order to minimize hazards, the flammability as well as the smoking and noxious gas generation characteristics of polymeric materials used in aircraft interiors have been of particular interest and research has been conducted to develop techniques whereby materials can be rendered non-flammable and whereby smoking and noxious gas generation by materials can be eliminated or at least minimized.

In addition to the production of structural members and composite panels as described above in which the flammability and smoking gas generation characteristics have been reduced, investigations of components employed in such materials, particularly those having desirably reduced flammability and smoking gas generation characteristics, have been the subject of interest in the prior art. For example, the production of polymeric materials and coatings to which fire retardancy additives such as antimony oxide, various phosphorus compounds, and the like have been incorporated to render the materials non-flammable are well known in the art. In addition, materials which intumesce upon heating, thereby decreasing the rate of flammability or generating gaseous materials which retard the burning are also well known. Intumescent materials have also been found to be advantageous due to the increase in thermal insulation characteristics which arise upon intumescence.

More specifically, U.S. Pat. Nos. 3,535,130 and 3,663,464 disclose an intumescent material for a coating, for example, as a paint, useful in fire protection. The intumescent material is an aromatic nitroamino compound, such as p-nitroaniline, generally in a salt form, dissolved or dispersed in a vehicle, or alternatively pre-polymerized and dissolved or dispersed in a vehicle. The disclosure is that upon heating, the coating intumesces, chars, and provides a flame-resistant coating. Unfortunately, sufficient flame-resistance is not achieved using this type of intumescent coating. Further, large volumes of smoke are generated and there is the possibility of the formation of toxic gases such as nitroaniline compounds.

U.S. Pat. No. 3,811,997 discloses smoke and flame resistant structural laminated articles comprising a thin film or an aromatic polyamide or polyimide laminated over an impregnated fibrous sheet, which may be optionally laminated over a honeycomb structure. In this patent, the polyimide/aromatic polyamide film protective surface sheet is a replacement for the prior art use of a metal foil on a light-weight honeycomb structure. Although such is an improvement over the prior art use of a metal foil since the replacement of the metal foil by such a film reduces the weight of the structure, again the film of the aromatic polyamide or the polyimide does not provide sufficient fire resistance. In particular, in a high heat flux environment, for example, of about $11 \times 10^4 w/m^2$, only minute protection to the composite structure is provided by the thin film.

As can be seen from an examination of the above, of which the references cited are representative of developments in the art directed toward improving the non-flammability characteristics, smoke and noxious gas generation characteristics, and light-weight nature of materials, it is desirable to have light-weight, non-flammable and non-noxious gas generating materials which can be used as structural members or panels in the aircraft industry, the ship-building industry and the domestic and commercial construction industry, particularly the aircraft industry.

SUMMARY OF THE INVENTION

An object of this invention is to provide a composite material, useful as a structural panel, which overcomes the difficulties and disadvantages of the prior art, providing improvements thereover.

A further object of this invention is to provide a low density, fire-resistant, non-smoking honeycomb core-laminate composite structure.

An even further object of this invention is to provide a honeycomb core-laminate composite structure useful as a thermal barrier in aircraft, ships, housing and commercial structures.

Still another object of this invention is to provide a honeycomb core-laminate composite structure having improved thermal protection and reduced levels of noxious gas generation upon burning.

A still further object of this invention is to provide a process for producing the honeycomb core-laminate composite structure of this invention.

Also an object of this invention is to provide useful articles including the honeycomb core-laminate composite structure of the invention.

In a first embodiment of this invention, this invention provides a honeycomb-laminate composite structure comprising a. a cellular core of a polyquinoxaline foam in a honeycomb structure, and b. a layer of a non-combustible fibrous material impregnated with a polyimide resin and laminated on a surface of the honeycomb structure.

In another embodiment of this invention, the invention provides a method for producing the above-described honeycomb-laminate composite structure, the method comprising:

i. incorporating a material capable, upon thermal polymerization, of forming a polyquinoxaline foam into the cells of a honeycomb structure;

ii. thermally polymerizing the material capable of forming the polyquinoxaline foam so as to form a polyquinoxaline foam within the cells of the honeycomb structure, and iii. subsequently laminating a layer of a non-combustible fibrous material impregnated with a polyimide resin on the surface of the honeycomb structure having the polyquinoxaline foam in the cells thereof.

DETAILED DESCRIPTION OF THE INVENTION

The honeycomb structure employed in this embodiment of the invention can be simply a material formed as a honeycomb structure of contiguous cells. The honeycomb core can have various types of cell configurations including, for example, square, rectangular, hexagonal, pentagonal, figure-eight, etc. configurations. A core structure with cells having a hexagonal configuration is in general used. Examples of suitable cellular configurations are disclosed in *Encyclopedia of Polymer Science & Technology*, Vol. 7, p. 509, and *Materials Engineering*, Nov. 1973.

Suitable honeycomb structures which can be employed include those made of polyamide and a combination of a polyimide and glass. A preferred honeycomb material is one of a polyamide because of its low weight (e.g., about 1.5 lb/ft³ (24 kg/m³)) and ready commercial availability. A suitable honeycomb structure with a hexagonal cell configuration which can be easily used is commercially available and is produced by the Hexel Corp. of Dublin, California or Orbitex Materials, Miami, Florida using Nomex (trade name of the E. I. duPont de Nemours Co., Inc.) as a polyamide. Other honeycomb structures can also be easily produced using techniques as disclosed in the *Encyclopedia of Polymer Sceince & Technology*, Vol. 7, p. 513.

The honeycomb structure as described above is used as a "base" and a compound which will form a polyquinoxaline foam upon thermal polymerization is introduced into the cells of the honeycomb structure. Examples of suitable materials which can be used to form the polyquinoxaline foam in the cells of the honeycomb structure include ammonium 4-nitroaniline-2-sulfonate, p-nitroaniline bisulfate, and the reaction product of p-benzoquinone dioxime and phosphoric acid. Ammonium 4-nitroaniline-2-sulfonate is commercially available or can be prepared according to the procedure described in U.S. Pat. No. 3,663,464 or the *Journal of Paint Technology*, Vol. 44, No. 571, Aug. 1972, p. 51. The p-nitroaniline bisulfate can be produced by reaction of p-nitroaniline, which is commercially available, with concentrated sulfuric acid as disclosed in U.S. Pat. No. 3,535,130. The reaction product of p-benzoquinone dioxime and phosphoric acid is disclosed in U.S. Pat. No. 3,730,891.

The compound capable of forming the polyquinoxaline foam can be placed in the cells of the honeycomb structure as a finely divided powder. A suitable particle size for the powder can be that which will pass a 65 mesh (U.S. standard screen) and be retained on a 270 mesh screen, preferably pass a 100 screen and be retained on a 150 mesh screen. Particle sizes within this range can be easily achieved by grinding and sieving to obtain particles within the above-described range. Alternatively, a dispersion of the compound capable of forming the polyquinoxaline foam in a liquid binder material can be introduced into the cells of the honeycomb structure. A preferred method of introduction of the compound capable of forming the polyquinoxaline foam is to dip the honeycomb core into a dispersion of the compound in a liquid medium, remove the core, and allow any excess dispersion to run off the honeycomb core. A suitable viscosity of the liquid dispersion can range from about 450 to 600 centipoise (cps), with a preferred viscosity being about 525 to 575 cps. A suitable density for the dispersion is about 0.80 to 1.10 gm/cc. The above described ranges are merely exemplary but operation within these ranges ensures penetration of the cells and avoids a local build-up of excess coating on the cells. A preferred binder which is used in the dispersion of the compound capable of forming the polyquinoxaline foam for coating the core is nitrocellulose from the standpoint of cost and ease of processing. Epoxy resins can be used as disclosed in U.S. Pat. No. 3,663,464. A preferred type of nitrocellulose is a 5-6 sec. type with a nitrogen content of about 11.8 to 12.2% by weight, which is commercially available in cotton form at 70% by weight solids (D. J. Simpson, South San Francisco, California). Other viscosity grades can also be used if desired, such as ½ sect to 40 sec grades, but are less preferred.

Solvents for the liquid medium can be ketones such as acetone, methyl ethyl ketone, methyl isobutyl ketone, etc., esters such as butyl acetate, amyl acetate, etc., alcohols such as methanol, glycols such as ethylene glycol, and glycol ethers such as monoglyme. Methyl ethyl ketone or methyl isobutyl ketone are preferred because of their solvent power. In addition, diluents such as toluene, xylene, petroleum naphthas, and ethyl acetate can be used to reduce the solvent costs by replacing solvents. Toluene and ethyl acetate are preferred diluents.

Once the cells of the honeycomb structure have been filled with the compound capable of forming the polyquinoxaline foam, the compound is thermally polymerized to form the polymeric material and also to form the foam. Suitable heating temperatures which can be employed in order to achieve the thermal polymerization can range from about 270° to about 300° C, preferably 280° to 285° C, for the ammonium-4-nitroaniline-2-sulfonate and the p-nitroaniline and about 150° to about 170° C, preferably 150° to 155° C, for the reaction product of p-benzoquinone dioxime and phosphoric acid. The thermal polymerization which occurs comprises a condensation reaction to form a polyquinoxaline foam structure and is described in the *Journal of Polymer Science*, Vol. 9, 317–323 (1971). The foaming during the polymerization is accompanied by the evolution of from about 0.065 to 0.50 liters/gm of reactants. The gases evolved during polymerization include water, sulfur dioxide, nitroaniline, benzene, hydrogen cyanide, and acrylonitriles and are collected by an exhaust means to prevent environmental pollution and degradation of the work area environment.

A suitable time period for the thermal polymerization at the temperatures indicated above and to achieve formation of the polyquinoxaline foam can range from about 1 minute to about 15 minutes, more generally from about 10 minutes to about 15 minutes. Polymerization and foaming in general can be considered completed once gas evolution and smoking cease.

The foaming reaction is generally accomplished as described above and upon completion, the honeycomb structure is filled with a black foam material having a low density, in general ranging from about 1.5 to about 5 lbs/ft$^3$, more generally 1.5 to 3 lbs/ft$^3$ (about 0.024 to about 0.08 gm/cm$^3$ more generally 0.024 to 0.048 gm/cm$^3$).

Once the honeycomb structure described above has been filled with the polyquinoxaline foam, generated as described above, the honeycomb structure containing the foam can then be machined, if desired, to remove any surface irregularities, cut to an appropriate size and subsequently one or more layers or plies of a non-combustible fibrous material impregnated with a polyimide resin can be laminated thereon. Alternatively, the structure could be formed with a desired curvature or shape prior to foaming by placing the structure on a mandrel.

Suitable non-combustible fibrous materials which can be employed include glass fibers, carbon fibers, graphite fibers, boron fibers, silicon carbide fibers, asbestos fibers, steel fibers, and other metallic fibers. Glass fibers are preferred from the standpoint of cost, weight, and ease of processing.

A suitable amount of the compound capable of forming the polyquinoxaline foam which can be used per unit area of the honeycomb core can range from about 1.5 to 5 gm/in$^2$ (0.23 to 0.77 gm/cm$^2$), preferably 2 to 4 gm/in$^2$ (0.31 to 0.62 gm/cm$^2$).

The non-combustible fibrous material as described above can be employed in the form of a woven or non-woven material. Where glass fibers are employed as the non-combustible fibrous material, the woven material can be plain, leno, or satin weave cloth. A satin weave cloth is preferred. The weight of the cloth can vary from about 19.67 gm/m$^2$ (0.58 oz/yd$^2$) to about 475 gm/m$^2$ (about 0.58 oz/yd$^2$ to about 14 oz/yd$^2$), preferably 102 to 305 gm/m$^2$ (3 to 9 oz/yd$^2$). The thickness of the cloth can vary from about 0.001 in. to about 0.014 in. (about 0.003 cm to about 0.036 cm). Further, where glass fibers are used as the non-combustible material, the non-woven fibrous material can be in the form of a glass mat commercially available in weights from about 0.75 to about 3 oz/ft$^2$ (about 228 to 915 gm/m$^2$). A woven material is preferred for ease of processing in the preparation of the honeycomb core-laminate composite structure of this invention. In addition to the above, for certain applications a knitted material could be used.

The fibrous material described above is impregnated with a polyimide resin. Suitable examples of polyimide resins which can be employed include bismaleimide resin, for example, a bismaleimido resin produced by the polymerization of 4,4'-bismaleimido-diphenylmethane monomer as disclosed in W. J. Gilwee et al, "High Temperature Resistant Composites for Bismaleimide Resin", *Proceedings of the 18th National SAMPE Symposium*, SAMPE, Los Angeles, Calif., April 1973, or a polyamino bismaleimide resin, as disclosed in U.S. Pat. No. 3,562,223 and by Mallet, *Modern Plastics*, p. 78 et seq., June 1973. Examples of bismaleimide resins which can be employed are commercially available under the tradenames of Kerimid 601 (tradename for polyamino bismaleimide) and Kerimid 353 (tradename for a mixture of three bismaleimides 4,4'-bismaleimido-diphenylmethane, 2,4-bismaleimido-toluene, and 2,2,4-(trimethyl)hexamethylene-bismaleimide); m.p.: 70° to 125° C, melt viscosity at 125° C: 115–150 cps; both produced by Rhodia, Inc., and H-353 [a eutectic mixture of 4,4'-bismaleimido-diphenylmethane, 2,4-bismaleimido-toluene, and 2,2,4-(trimethyl)-hexamethylene-bismaleimide]m.p.: 100°–125° C; viscosity: 150 cp at 120° C)-produced by Technochemie Heidelberg, West Germany as described in H. Petrovichi and H. Stenzenberger, "The Processing and Properties of High Temperature Resistant Polybismaleimide Carbon-Fiber Laminates", 32nd Annual Technical Conference, Society of Plastics Engineers, San Francisco, May 13–16, 1974. Kerimid 601 can be employed as a solution for impregnation and the Kerimid 353 can be impregnated as a hot melt. A preferred bismaleimide resin comprises that produced from 4,4'-bismaleimido-diphenylmethane.

The fibrous material is impregnated with the polyimide resin as described above. Suitable techniques for impregnation can include dipping, brushing, spraying, etc. A suitable amount of the polyimide resin impregnated into the fibrous material can range from about 20% by weight to about 40% by weight, more generally about 30% by weight to about 35% by weight, based on the total weight of the pre-preg.

The impregnation of the fibrous material with polyimide resins is generally conducted as a solution of the resin in an appropriate solvent. Suitable solvents which can be employed include 1-methyl-2-pyrrolidinone and dimethylformamide. The impregnation can be in general accomplished at a temperature of about 20° to 40° C, more generally about 22° to 30° C. Once the impregnation is accomplished, the impregnated fibrous material (hereinafter for brevity designated as "pre-preg"), is dried for about 10 to 30 min. at about 70° to 90° C, preferably for about 15 min. at about 80° C, to remove solvent; then for about 15 to 40 min. at about 90 to 150° C, preferably for about 20 min. at about 95° C, to advance the cure of the polyimide resin so that the resin will not flow out under pressure during the cure. The thickness and weight per unit area of the pre-preg will vary dependent upon the type of fibrous material used but in general the polyimide resin content in the pre-preg will range from about 30 to 40% by weight, preferably about 35% by weight based on the total weight of the pre-preg, the volatiles content of the pre-preg will range from about 0 to about 5% by weight, preferably less than 1% by weight based on the total weight of the pre-preg, and a suitable resin flow can range from about 5 to 20%, preferably about 15%.

In producing the pre-preg as described above the monomer for forming the polyimide resin is simply dissolved in a solvent as described hereinbefore, the fibrous material impregnated with the solution containing the monomer and the monomer polymerized to form the polyimide resin. Such a pre-preg containing one layer of the fibrous material can be described as being a single ply pre-preg. Multiple layers, in general up to three layers, can be employed if desired. A single layer (or single ply pre-preg) is preferred because of its lower weight.

As described above, the pre-preg is then laminated and adhered to the polyquinoxaline foam-filled honeycomb structure. This, in general, can be accomplished in alternative ways. One method to achieve lamination and adhesion of the pre-preg to the honeycomb structure includes the preparation of a pre-preg containing the polyimide resin in only a partially cured state and the lamination of the pre-preg containing the partially cured resin onto the honeycomb structure followed by heating at about 180° to about 200° C for about 30 minutes to 1 hour under a pressure of about 40 to 60 lb/in$^2$ (176 to 414 kN/m$^2$), preferably for about 1 hour at about 180° C and 50 lb/in$^2$ (345 kN/m$^2$) to bind the pre-preg to the surface of the honeycomb structure.

Alternatively, the pre-preg can be previously prepared by completely curing the polymide resin impregnated therein and the pre-preg subsequently adhered to the surface of the honeycomb structure using an adhesive. Suitable adhesive materials include adhesives such as polyimide or epoxy adhesives. Suitable specific examples of adhesives which can be employed include FM-34 produced by American Cyanamid, a tradename for an aluminum powder filled (50 wt.%)polyimide film of a polyimide precursor, having a molecular weight of less than 1000, prepared from the reaction product of an aromatic diamine such as m-phenylenediamine and methylenedianiline and a dianhydride such as benzophenone dianhydride and pyromellitic dianhydride. Alternative materials which can be used as the adhesive for bonding the pre-preg to the honeycomb structure include materials such as Kerimid 500 and Kerimid 501 commercially available from Rhodia, Inc. Kerimid 500 is polyamideimide adhesive available as a brown colored solution in N-methylpyrrolidone with solids content of 22–23% by weight and Brookfield viscosity at 77° F of 10–13,000 cps (50 RPM Spindle 6). Kerimid 501 is a polyamideimide adhesive available as a yellow colored film (solvent content: 20–30% by weight) protected with polyethylene terephthalate sheets (*Rhodia Technical Information Bulletin*, Rhodia, Inc., New York, New York).

The lamination of the pre-preg to the honeycomb structure as described above can be accomplished at a temperature ranging from about 180° to about 200° C, more generally 180° to 185° C and under a pressure of about 1 to 50, more preferably 40 to 50 lb/in$^2$ (about 6.9 to 344, more preferably 275 to 344 kN/m$^2$). A suitable lamination in order to achieve the bonding of the pre-preg to the honeycomb structure surface in general can range from about 45 min. to 75 min., more generally about 55 to 65 min.

The honeycomb-laminate composite structure produced in accordance with the above and using the materials in accordance with the above has various advantageous properties including (a) a low area density of about 0.5 to 0.8 lb/ft$^2$/in thickness (about 2.4 to 3.9 kg/m$^2$/2.54 cm thickness), more generally about 0.5 to 0.7 lb/ft$^2$/in thickness (2.4 to 3.4 kg/m$^2$/2.54 cm thickness) (b) fire resistance, for example, passes the Federal Aviation Vertical Burn Test (FAA 25.853) and (c) low smoke production, for example, had a specific optical density of 8 to 13 when tested in the National Bureau of Standards smoke chamber under flaming conditions, U.S. Department of Commerce, Building Science Series 18.

More specifically, in terms of thermal protection, an 8 inch by 8 inch by 1 inch (20 by 20 cm by 2.54 cm) thick honeycomb core-laminate composite structure material of this invention, comprising a honeycomb structure having a thickness of 1 in. (2.54 cm) and containing about 0.02 gm/cm$^3$ of a polyquinoxaline foam produced from the thermal polymerization of ammonium 4-nitroaniline-2-sulfonate and having laminated thereto one layer of a pre-preg of a glass cloth of fibers impregnated with 33% by weight of a polyimide resin derived from 4,4'-bismaleimido-diphenylmethane was exposed to a heat flux of 11 btu/ft$^2$sec. (11 × 10$^4$w/m$^2$). The temperature on the side opposite to that exposed to heat was recorded 7 minutes after exposure using the test method described in S. R. Riccitiello et al, *J. of Cellular Plastics*, 7, No. 2, March/April 1971, pp. 3–8. The surface temperature of the honeycomb core-laminate composite structure material of this invention was 200° F (93° C). This is in contrast to the prior art material comprising a Nomex honeycomb structure with face sheets of a glass fiber impregnated with an epoxy resin which, when subjected to the same testing conditions, showed temperatures exceeding 200° F (93° C) in 2 minutes and in 7 minutes the temperature reached 950° F (510° C).

Furthermore, upon testing in a NBS smoke chamber, the honeycomb core-laminate composite structure of this invention showed a specific optical density of 8.0 after 90 seconds, 9.5 after 2 minutes, 12.8 after 4 minutes, and a maximum specific optical density of 14.6. The time period, tc, to reach a critical specific optical density of 16 was infinity. In contrast to this situation, the prior art material as described hereinbefore had a specific optical density of 49.7 after 90 seconds, 50.2 after 2 minutes, 53.2 after 4 minutes, and a maximum specific optical density of 61.8. The time period, tc, to reach a critical optical density of 16 for this prior art material was 30 seconds.

In addition, the honeycomb core-laminate composite structure of this invention achieves an improvement in fire-resistance and smoke generation as described above with substantially no appreciable increase in weight. More specifically, the weight of the honeycomb core-laminate composite structure of this invention described above was 0.588 lb/ft$^2$ (2.9 kg/m$^2$) per inch of thickness, while the weight of the prior art material was 0.570 lb/ft$^2$ (2.8 kg/m$^2$) per inch of thickness.

The following examples are given to illustrate in greater detail specific embodiments of the honeycomb core-laminate composite structure of this invention. These examples are given for the purposes of illustration, and should not be construed as limiting the scope of the invention. Unless otherwise indicated, all parts, percents, ratios and the like are by weight and all procedures were conducted at room temperature (about 20°-30° C) and at normal atmospheric pressure.

EXAMPLE 1

Ammonium 4-nitroaniline-2-sulfonate was prepared according to the procedure described in the *Journal of Paint Technology*, Vol. 44, No. 571, p. 51, Aug. 1972, and was then converted into a coating composition using the following formulation:

| Component | Amount |
|---|---|
| | (parts) |
| ammonium+4-nitroaniline-2-sulfonate | 23 |
| Nitrocellulose* | 7 |
| Methyl Ethyl Ketone (18%) | 34 |
| Toluene | 18 |
| Ethyl Acetate | 18 |

*5–6 sec. viscosity ASTM D301-56; 11.8–12.2 wt.% nitrogen; 30 wt.% solids in methanol.

This coating was coated on a polyamide honeycomb structure comprising cells of a hexagonal configuration generally having a size of about 0.32 cm and allowed to dry in the air for about 2 to 24 hours.

In coating the coating composition described above onto the honeycomb structure, a wire screen was placed on either side of the honeycomb structure panel and three layers of a glass cloth, style 181 were placed next to each wire screen. This assembly was then restrained between heated plattens and heated to 280° C whereby the ammonium 4-nitroaniline-2-sulfonate expanded, foamed and filled the cellular voids in the honeycomb structure. The foaming reaction was completed in about 1 to 5 minutes, and the evolution of gas, which was allowed to escape, ceased within about 10 minutes. The density of the polymeric foam formed in the honeycomb structure was between about 1.0 to 2.0 lbs/ft$^3$ (16 to 32 kg/m$^3$).

Once the honeycomb structure described above and filled with the polymeric foam had been produced, the layers of glass cloth on either side of the wire screen and the wire screen on either side were removed and a pre-preg comprising a glass cloth of woven glass fivers (coating style 181, A1100 silane finish) was laminated thereon.

The pre-preg was produced by coating the woven glass with a varnish of 4,4'-bismaleimide-diphenylmethane. This varnish was prepared by dissolving the 4,4'-bismaleimide-diphenylmethane in 1-methyl-2-pyrrolidinone at a 40% by weight monomer solids concentration. The viscosity of this coating varnish at 23° C was 50 centipoises. After coating the varnish as described above onto the glass cloth, the glass cloth was dried for 15 minutes at 79° C and partially polymerized (staged) for 20 minutes at 150° C. The pre-preg was found to have a volatile content of 0.02% by weight, a resin flow of 15% and a resin content of 40% by weight. After staging, the pre-preg was found to have substantially no retained solvent. The resin flow is a value calculated on the amount of resin which flows under pressure and is obtained on dividing the weight of the laminate (plies cured together) with flash minus the weight without the flash (i.e., the amount of polymer resin which flows out from the assembly of pre-pregs) divided by the weight of the laminate with the flash minus the weight of the glass.

After the pre-preg was prepared as described above, the pre-preg was cut into a suitable size, stacked, and pressed between aluminum plates with a Teflon (0.127 mm) film release sheet. The cure of the pre-preg was performed in a flat platten press and the assembly was placed in a cold press and heated at a rate of 3° C/min. at 689 kN/m$^2$ (100 psi) to 240° C and held at 240° C for 2 hours. The pre-preg thickness comprised 1 to 3 plies.

This pre-preg was then adhered to one surface of the honeycomb core-structure produced above using a film or liquid adhesive, e.g., a film adhesive such as FM-34 or a liquid adhesive such as Kerimid 500, which was placed between the honeycomb and the pre-preg face sheet. A suitable amount of the film adhesive ranged between 0.02 lb/ft$^2$ and 0.06 lb/ft$^2$ (0.1 to 0.3 kg/m$^2$), preferably 0.025 to 0.035 lb/ft$^2$ (0.12 to 0.17 kg/m$^2$) and a suitable amount of the liquid adhesive was 0.2 to 0.5 gm/in$^2$ (0.03 to 0.08 gm/cm$^2$), preferably 0.3 to 0.4 gm/in$^2$ (0.05 to 0.06 gm/cm$^2$). The adhesive layer was then bonded at 180° to 200° C, preferably 180° to 185° C, and under a pressure of 1 to 50 lb/in$^2$ (6.9 to 344 kN/m$^2$), preferably 40 to 50 lb/in$^2$ (275 to 344 kN/m$^2$).

EXAMPLE 2

A slurry of benzoquinone dioxime (135 gm) and phosphoric acid (225 gm) was coated on a 30.5 cm by 30.5 cm honeycomb panel core structure with 0.32 cm hexagonal cell size and heated to 150° C with the slurry confined within the honeycomb core. Porous plates were used to allow the large volume of gases (1162 liters/m$^2$) generated during foaming to escape. A black foam filled the cells during the reaction. After foaming, the honeycomb was brushed to remove foam from the surface and to provide space for later filleting of an adhesive for the bonded pre-preg sheet. The density of foam within the cores was 1.7 to 2.0 lb/ft$^2$ (27.3 to 32 kg/m$^3$). Pre-preg face sheets for the honeycomb core structure were produced with a bismaleimide resin (Kerimid 601, Rhodia Inc.) solution coated on glass cloth, staged for 30 min. at 93° C and then cured as single plies at 183° C and 689 kN/m$^2$ for 1 hr., followed by a post-cure of 12 hours at 250° C. The cured face sheets were then covered on one side with a polyimide film adhesive (FM-34, American Cyanamid Co.) and bonded to the honeycomb core at 180° C and 345 kN/m$^2$ pressure.

EXAMPLE 3

A honeycomb core was prepared as described in Example 2. The face sheets in this example were prepared by solvent coating the bismaleimide resin on glass cloth, staging the resin for 30 min. at 93° C. These staged face sheets were then applied directly to the honeycomb core without the use of the adhesive film as described in Example 2. The face sheet was bonded to the honeycomb core at 180° C and 345 kN/m$^2$.

EXAMPLE 4 p-Nitroaniline bisulfate was prepared according to the procedure described in the SAMPE Journal, Aug.-/Sept. 1968, p. 15, and formulated into a coating composition using the following components:

|  | Weight % |
| --- | --- |
| Methyl Ethyl Ketone | 32.8 |
| Nitrocellulose* | 6.9 |
| p-Nitroaniline | 27.5 |
| Ethyl Alcohol | 13.1 |
| Sulfuric Acid | 19.7 |

*As described in Example 1.

The coating composition was applied to a 0.312 cm cell size honeycomb core at a rate of 0.20 to 23 gm/cm². The coating was dried for 1 hr. at 100° C. The coated honeycomb core was heatd to 316° to 371° C while being confined between porous plates as described in Example 1. Pre-preg face sheets were then bonded to the coated honeycomb core using procedures shown in Examples 1, 2 or 3.

EXAMPLE 5

Honeycomb cores were prepared by procedures shown in Examples 1, 2 or 4. The pre-preg face sheets were prepared by coating glass cloth with a hot-melt addition type polyimide such as H353 from Rhodia, Inc. The coated cloth was then cured at 180° C and 690 kN/m² pressure for 1 hr. The pre-preg face sheets were then bonded to the honeycomb core using a polyimide film adhesive as used in Example 1.

EXAMPLE 6

Honeycomb cores were prepared by placing 0.15 to 0.31 gm/cm² powdered (0.250 mm to 0.053 mm) ammonium 4-nitroaniline-2-sulfonate into the cells of a hexagon-shaped (0.312 cm cell size) polyimide honeycomb. The honeycomb core was heated to 280° C with porous plates on either side of the core to allow the gases to escape. A black foam filled the cells of the honeycomb core during the thermal polymerization. The excess foam was brushed from the surface of the honeycomb core and pre-preg face sheets were bonded to the surface as in Examples 1, 2, 3, 4 or 5.

EXAMPLE 7

Honeycomb cores were prepared by placing 0.14 to 0.31 gm/cm² powdered (0.250 mm to 0.053 mm) p-nitroaniline bisulfate into the cells of a honeycomb core and heating to 280° C. Pre-preg face sheets were then prepared and bonded as in the previous examples.

EXAMPLE 8

A honeycomb core was prepared as in Example 1. Pre-preg face sheets were made by solvent coating a glass mat (228 to 915 gm/m²) with 30 to 40 wt.% of a polyimide resin as in Example 2. The glass mat and polyimide resin were staged 30 min. at 93° C and cured as single plies at 183° C and 689 kN/m² for 1 hour. The cured pre-preg face sheets were bonded to the honeycomb core using a film adhesive as in Example 2.

The honeycomb core-laminate composite structure of this invention is useful as a light weight thermal barrier material, particularly for utilities requiring low density, fire-resistance and non-smoking characteristics, such as panels and secondary structures in aircraft, watercraft, etc.

In addition, if desired, various decorative finishes, films, and the like can be applied to the honeycomb-laminate composite structure of this invention. More specifically, it has been found that a particularly useful panel for an aircraft comprises coating a layer of a phenophthalein polycarbonate film as described in "Development of Transparent Composites and Their Thermal Responses", J. A. Parker, G. M. Fohlen, and P. M. Sawko, presented at Conference on Transparent Aircraft Enclosures, sponsored by Air Force Materials Laboratory and Air Force Flight Dynamics Laboratory at Las Vegas, Nev., Feb. 5-8, 1973, with or without a decorative ink or design, and bonding such to the pre-preg surface with a heat-curable epoxy resin, for example, chlorendic anhydride epoxy, such as Epon 828, supplied by Shell Chemical and chlorendic anhydride supplied by Hooker Chemical Co., etc. An alternative adhesive which can be used to bond the phenophthalein polycarbonate film to the surface of the pre-preg could be a polycarbonate resin, for example, bisphenol A polycarbonate (Lexan, such as produced by General Electric Co.), dissolved in a solvent such as methyl chloride. Alternatively, a polyvinyl fluoride layer having a decorative ink layer could be included between the phenophthalein polycarbonate film layer and the surface of the pre-preg of the honeycomb core-laminate composite structure of this invention. This type of structure provides a particularly useful panel having desirable characteristics of light weight, fire resistance, and non-smoking characteristics as well as being decorative, being abrasion resistant, and having long-lasting surface characteristics.

A particularly preferred article produced incorporating the honeycomb-laminate composite structure of this invention comprises a polyamide honeycomb structure in which the cells are filled with a polyquinoxaline foam laminated with a glass-fiber/bismaleimide resin impregnated sheet and whose outer surface is covered with a layer of phenolphthalein polycarbonate. A specific example thereof is described in the Reference Example below. A conventional prior art composite is also shown for the purpose of comparison.

REFERENCE EXAMPLE

Figure 1:
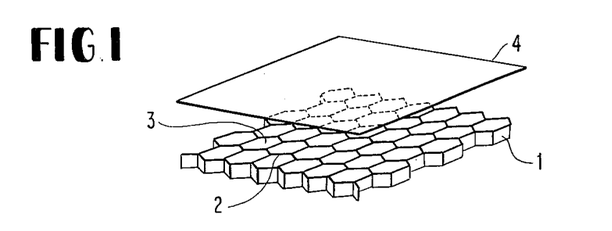
FIG. 1 shows an exploded view of the honeycomb core-laminate composite structure of the invention, in which 1 is the honeycomb structure formed of hexagonal cells 2, 3 shows the polyquinoxaline foam present in the hexagonally shaped cells of the honeycomb structure 1, and 4 represents a layer of a non-combustible fibrous material impregnated with a polyimide resin laminated on the foam-filled honeycomb structure.
Figure 2A:
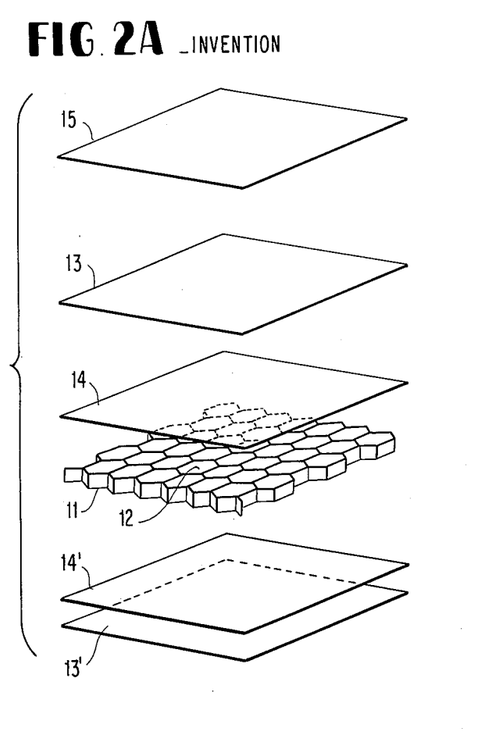
FIGS. 2A and 2B show an exploded view of one embodiment of an article containing a honeycomb-laminate composite structure of this invention and an article for comparison containing a honeycomb-laminate composite of the prior art as described in the Reference Example, respectively.

As described in FIG. 2A, a polyamide honeycomb of hexagonal cells (11) and with a cell size of 0.312 cm was coated with a composition of the formulation and with the properties shown in the following tables.

| Components | Amount |
| --- | --- |
|  | (Weight %) |
| Methyl Ethyl Ketone | 32.8 |
| Nitrocellulose* | 6.9 |
| p-Nitroaniline | 27.5 |
| Ethyl Alcohol | 13.1 |
| Sulfuric Acid | 19.7 |
| Properties of Coating Composition | |
| Non-Volatile (wt.%) | 54 |
| Density (gm/cm³) | 1.09 |
| Viscosity (Brookfield, 25° C cps) | 1300 |
| Fineness of Grind (Hegeman Scale ASTMD-1210 | 4+ |
| p-Nitroaniline plus Sulfuric Acid/ Nitrocellulose Ratio (by wt.) | 6.9 |
| p-Nitroaniline/Sulfuric Acid Ratio (by wt.) | 1.4 |

*As described in Example 1.

The amount (dry basis) of the coating composition was used approximately 0.20-0.23 g/cm² (honeycomb face area). After coating, the coating was dried at 100° C for 1 hour. The coated honeycomb was heated at a temperature of 316°-371° C to form the polyquinoxaline foam (12), and any excess amount of foam was removed from the faces of the honeycomb.

The bismaleimide used in producing the pre-preg to be laminated on each side of the honeycomb core was a hotmelt, addition type polyimide, Kerimid 353. The pre-pregs (13, 13') were prepared from this resin and 1 to 4 pieces of 181 E-glass cloth were used to form flat laminates. Softening of the polyimide resin occured at 70° C, and the resin became tacky at 50° C.

Laminates are prepared by placing them in a rubber bagging and cured in an autoclave at a heating rate of 1° to 2°/minute to 180° C under a vacuum of 29-30 in Hg (95-102 kN/m²) and with an applied pressure of 690 kN/m². The laminates were cured for 1 hour at 180° C and adhered to the polyquinoxaline-filled honeycomb structure with a polyimide resin (14, 14') (Kerimid 501), using contact pressure in a heated press at 170° C for 2 hours. After production of the honeycomb pre-laminate composite, a phenolphthalein polycarbonate film (15) was adhered to the surface of the composite with a chlorendic anhydride-epoxy adhesive and bonded by applying a contact pressure in a mold at 150° C.

Figure 2B:
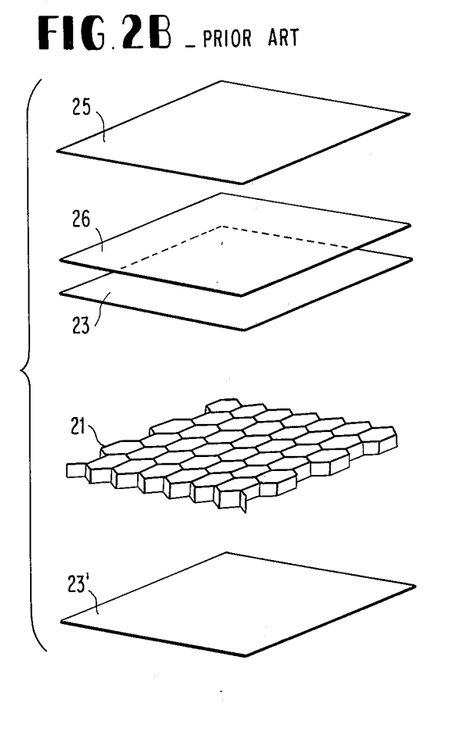

For comparison, a conventional honeycomb-laminate composite structure was produced using an unfilled polyamide, hexagonal-cell honeycomb structure as described above (21). An epoxy resin-preimpregnated pre-preg of glass fibers (Type 120E) previously bonded to a glass fiber (181E glass/polyvinyl fluoride laminate with polymethylmethacrylate (23, 23')) was bonded each side of the honeycomb core structure. A polyvinyl fluoride film layer aesthetically decorated (26) was bonded onto the surface of one of the pre-pregs (23) and a polyvinyl fluoride film (25) was further adhered thereon with a polymethyl methacrylate adhesive. Curing was accomplished at 110° C with 50 cm Hg minimum vacuum pressure.

Exploded views of the composite structures of the invention and for comparison produced as described above are shown schematically in FIGS. 2A and 2B, respectively.

Typical flammability and smoke characteristics of the composites produced as described above are shown in the table below.

| Material | Amount (Weight %) | Char Yield (YC, $N_2$, 700° C, %) | Polymer Decomposition Temp. (Td, ° C, $N_2$) | Limiting Oxygen Index $\frac{O_2}{N_2 + O_2}$, ASTM (D-2863) |
|---|---|---|---|---|
| INVENTION | | | | |
| Phenolphthalein Polycarbonate [1] | 5.0 | 58 | 425 | 38 |
| Glass:$SiO_2$ | 30.0 | 100 | — | >70 |
| Bis-Maleimide [2] | 30.0 | 45 | 430 | 46 |
| Polyamide:Poly(m-Phenylene Isophthalamide) [3] | 20.5 | 48 | 420 | 44 |
| Polyquinoxaline [4] | 14.5 | 90 | 530 | 48 |
| COMPARISON | | | | |
| Polyvinyl Fluoride [5] | 7.6 | 10 | 400 | 20 |
| Glass:$SiO_2$ | 419 | 100 | — | >70 |
| Epoxy:4,4'-Isopropylidenediphenol (Bisphenol A) [6] | 30.0 | 23 | 180 | 21 |
| Polyamide:Poly(m-Phenylene Isophthalamide) [3] | 20.5 | 48 | 420 | 48 |

A = diamine as described in U.S. Pat. No. 3,562,223

| Material | Amount (Weight %) | Char Yield (YC, N₂, 700 °C, %) | Polymer Decomposition Temp. (Td, °C, N₂) | Limiting Oxygen Index $\frac{O_2}{N_2 + O_2}$, ASTM (D-2863) |
|---|---|---|---|---| n is such that the molecular weight is about 1,000 to 100,000.

| Property | Composite Structure | |
|---|---|---|
| | Comparison | Invention |
| Density (ASTM D-71 (kg/m³) | 96 | 96–113 |
| Tensile Strength Flatwise (ASTM C307, 24° C (kN/m²) | 610 | 517–690 |
| Fire Endurance (Time to Reach Back Face Temperature of 204° C with Front Face Heat Flux of 11 × 10⁴W/m²)(min) | 2 | 10 |
| Smoke Density (NBS, Ds 4 min. Specific Optical Density | 58.7 | 45 |
| Component Smoke Density (Maximum Specific Optical Density (NBS Smoke Chamber)) | Polyvinyl Fluoride 7 | phenol Polycarbonate 5 |
| | Polyamide Core 2 | Polyamide Core 2 |
| | Epoxy Resin 90 | Bismaleimide Resin 9 |
| | Glass — | — |

From the above, it can be seen that at equivalent density the fire containment or fire endurance capability of the composite structure of this invention has been improved by a factor of five in comparison with the comparison composite structure. This improvement is believed to be due to the thermal protection efficiency of the high-char-yield polyquinoxaline foam filling the honeycomb of the composite structure of this invention. It can also be seen from the above that the composite structure of this invention can result in a significant reduction in the specific optical smoke density when tested in the NBS smoke chamber. Examination of the smoke density values for the constituent components of these composites clearly shows that the principal contributor to smoking is the epoxy-laminating resin in the comparative composite structure. The bismaleimide resin replacing the epoxy effectively reduces the total smoke produced from the composite structure of the invention.

Figure 3:
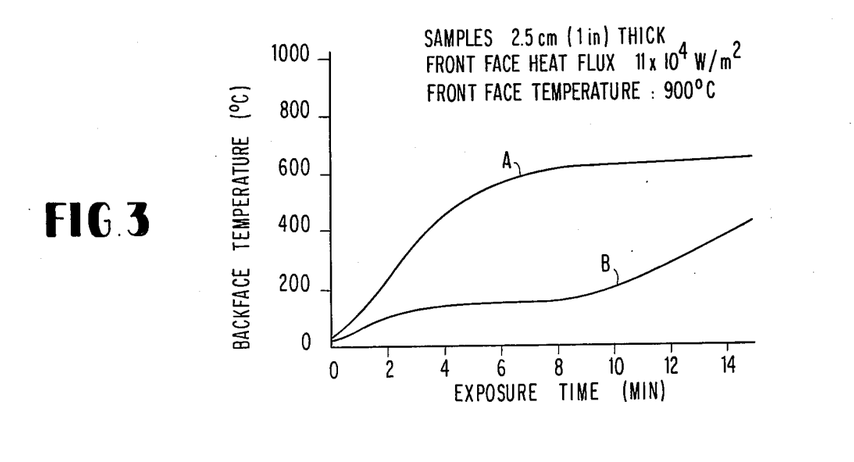
FIG. 3 shows the thermal insulation characteristics of the articles shown in FIG. 2 as described in the Reference Example.

FIG. 3 shows the fire endurance of containment capability of the comparative composite structure (Curve A) and invention compositive structure (Curve B) under conditions of the NASA-Ames T-3 test conducted as disclosed in "The Performance of Lightweight Plastic Foams Developed for Fire Safety", Proceedings of the NASA Conference on Materials for Improved Fire Safety, May 1970, p. 11-1. In FIG. 3, the backface temperature increase is shown as a function of the time in minutes when the composite structure is subjected to a front face heat flux of 11 × 10⁴ W/m². It can be seen that the backface temperature of the conventional composite structure reaches 200° C in 2 minutes whereas it takes as long as 9 minutes to reach a comparable backface temperature in the composite structure of this invention. In addition, the composite structure of this invention exhibited less distortion and better structural integrity after testing than the comparative composite structure.

In addition, if desired, the honeycomb core-laminate composite structure of this invention can be coated or painted, machined to the desired surface characteristics, cut to the desired shapes, and the like, for ultimate end use application.

While the invention has been described in detail and with reference to specific embodiments thereof, it will be apparent to one of skill in the art that modifications and variations can be made therein without departing from the spirit and scope thereof.

What is claimed is:

1. A honeycomb-laminate composite structure comprising
   a. a cellular core of a polyquinoxaline foam in a honeycomb structure, said foam having a density within the range of about 1.5 to about 5 lb/ft³, and
   b. a layer of a non-combustible fibrous material impregnated with a polyimide resin laminated thereon.

2. The composite structure of claim 1, wherein said honeycomb structure is a polyamide honeycomb structure.

3. The composite structure of claim 1, wherein said polyquinoxaline foam comprises the thermal polymerization product of ammonium 4-nitroaniline-2-sulfonate, p-nitroaniline bisulfate or the reaction product of p-benzoquinone dioxime and phosphoric acid.

4. The composite structure of claim 3, wherein said polyquinoxaline foam comprises the thermal polymerization product of the reaction product of benzoquinone dioxime and phosphoric acid.

5. The composite structure of claim 1, wherein said honeycomb structure comprises a honeycomb structure of cells having a square, rectangular, pentagonal, hexagonal or figure-eight configuration.

6. The composite structure of claim 5, wherein said honeycomb structure comprises a honeycomb structure of cells having a hexagonal configuration.

7. The composite structure of claim 1, wherein said non-combustible fibrous material comprises fibers of carbon, graphite, glass, boron, silicon carbide, asbestos or a metal.

8. The composite structure of claim 7, wherein said non-combustible fibrous material is a woven or nonwoven cloth of glass fibers.

9. The composite structure of claim 1, wherein said polyimide resin is a bismaleimide resin obtained by the polymerization of 4,4'-bismaleimido-diphenylmethane.

10. The composite structure of claim 1, wherein said layer of said non-combustible fibrous material impregnated with said polyimide resin is adhesively laminated to said cellular core with an epoxy or polyimide adhesive.

11. The composite structure of claim 1, including additional layers of a non-combustible fibrous material impregnated with said polyimide resin laminated with said layer of said non-combustible fibrous material impregnated with said polyimide resin.

12. The composite structure of claim 1, wherein the proportion of the polyimide resin impregnated in the fibrous material ranges from about 20% by weight to about 40% by weight based on the total weight of said fibrous material and said polyimide resin.

* * * * *